United States Patent [19]

Swisher

[11] Patent Number: 4,600,593
[45] Date of Patent: Jul. 15, 1986

[54] METHOD FOR REMOVING SKINS FROM AVOCADOS

[75] Inventor: Horton E. Swisher, Upland, Calif.

[73] Assignee: Cal-Flo Corporation, Covina, Calif.

[21] Appl. No.: 778,845

[22] Filed: Sep. 23, 1985

Related U.S. Application Data

[63] Continuation-in-part of Ser. No. 628,920, Jul. 9, 1984, abandoned.

[51] Int. Cl.⁴ ............................................. A23L 1/212
[52] U.S. Cl. .................................... 426/438; 426/482
[58] Field of Search ................ 426/438, 615, 629, 482

[56] References Cited

U.S. PATENT DOCUMENTS 1,438,467 12/1922 Walden ............................... 426/438
2,641,548 6/1953 Heinrich .............................. 426/438

OTHER PUBLICATIONS

D. Swern editor, 1964 Bailey's Industrial Oil and Fat Products, Interscience Publishers, New York.

Primary Examiner—Raymond N. Jones
Assistant Examiner—Carolyn Paden
Attorney, Agent, or Firm—Paul A. Weilein

[57] ABSTRACT

A method is disclosed for removing skins from avocados wherein the avocados are immersed in a hot triglyceride oil maintained at a temperature in the range of about 275° to 400° F. The avocados are immersed in the oil for a period of time in the range of about six seconds to one minute in order to develop a substantial temperature differential across the avocado skin and produce a generally continuous vapor boundary between the skin and the avocado flesh. This facilitates removal of the skin with only minimal heating of the thermally sensitive avocado flesh and minimizes development of off-flavors. When the avocados are removed from the oil the skins are then cut through and separated from the avocado flesh within a short time to preserve the quality of the avocado flesh.

13 Claims, 3 Drawing Figures

METHOD FOR REMOVING SKINS FROM AVOCADOS

This is a continuation-in-part of application Ser. No. 628,920, filed July 9, 1984 by Horton E. Swisher under assignment to Cal-Flo Corporation, now abandoned.

BACKGROUND OF THE INVENTION

The present invention relates to a process for removing skins from avocados and more particularly to such a process involving thermal treatment of the avocados to result in skin removal.

Avocados are similar to other foods including fruits and vegetables such as tomatoes and peaches, at least to the extent that the skins must generally be removed before conversion to a processed food product. However, the processing of avocados to remove their skins has not developed at the same pace as other such foods because of the thermal sensitivity of the avocado flesh.

By contrast, in the processing of food products such as tomatoes and peaches, they are commonly immersed in hot or boiling water in order to facilitate removal of the skins by conventional techniques which are well known in the prior art. Such a technique is particularly adapted for use with these food products since the flesh portion of tomatoes and peaches is intentionally cooked during processing. In any event, heating of such foods has no deleterious effects and may be considered an improvement in terms of flavor, texture, color or otherwise. On the other hand, as will be discussed in greater detail immediately below, such processing techniques have not proven satisfactory with avocados because of thermal sensitivity of the avocado flesh. Such thermal sensitivity is particularly noticeable in the green or chlorophyll layer of the avocado flesh because it lies just beneath the avocado skin and is thus subject to greatest exposure to heat transferred through the skin. Since much of the flavor and nutritional value of the avocados is found in this layer, it is particularly desirable that the green chlorophyll layer of the flesh be maintained in fresh condition to enhance both the flavor and color of resulting food products. However, since the green chlorophyll layer also lies immediately adjacent the skin, it is particularly subject to thermal degradation if the skin is removed by conventional thermal techniques.

Many different varieties of avocados are commercially important, including the Fuerte, Hass, Bacon, Reed, Zutano and Pinkerton varieties. The Fuerte and Hass varieties are probably of greatest commercial importance in California where avocado orchards are most prevalent.

Although there are some differences in these varieties, all avocados tend to be characterized by skins which are relatively tough or leather-like and which resist separation from the avocado flesh. Other characteristics of avocado skins many vary, for example, from the relatively thin smooth skin of the Zutano variety to the relatively thick and pebbly skin of the Hass variety.

The fruit or flesh of the avocado is relatively unique since it accumulates a large lipid reserve during development or ripening, thus providing an important potential source of dietary fat without the presence of undesirable cholesterol. Also, the avocado is rich in vitamin B, particularly pyridoxine and pantothenic acid while providing a reasonable amount of vitamin E (alpha-tocopherol). The mineral content of the avocado is also higher than other fresh fruit, particularly for phosphate, iron and potassium which are of substantial nutritional importance.

Thus, because of its high nutritive value and unusual composition, the avocado fruit has special value as a food product. However, in view of its characteristics as outlined above, the avocado is most useful in a fresh or fresh-frozen form. Because of the relative expense and difficulty in removing avocado skins in the past, the level of use of avocados in various food products has heretofore been limited. It is believed that market demand would be substantially greater is the avocado flesh were readily available with the skin and pit removed and absent thermal off-flavors and the like.

In the past, as was noted above, it has been well known that the heating of avocado flesh tends to develop off-flavors, thus precluding thermal processing to facilitate skin removal. The occurrence of off-flavors in thermally processed avocados has been well-documented, for example, in a 1951 review by Cruess, et al (Cruess, W. V., Gibson, A. and Brekke, J. F., Canner 112[2]:11:112[3]). R. P. Bates also discussed heat-induced off-flavor development during the processing of ripened avocado flesh (Journal of Food Science 35, 478, 1970). Referring to the above article by Bates, it is noted that, "The avocado, in contrast to most food crops, cannot be subjected to thermal processing or to air-drying without the production of off flavors. The deleterious flavor changes are characterized by an intense 'blanched' aroma, a disagreeable pungent mouth-coating taste and an unpleasant lingering after-taste which, in many avocado varieties, is accompanied by bitterness."

Also, according to Ben-Et Dolev. A. and Tatarsky, O. (Journal of Food Science 38, 546–547, 1973), the blanching of avocados causes heat-induced production of 1-acetoxy-2,4-dihydroxyl-n-heptadec-16-ene and similar compounds which are characterized by a bitter taste.

For these reasons, the processing of avocados has heretofore been limited by relative expense and difficulty in removing the avocado skins. In many operations, the skins have been removed manually, not only resulting in an expensive and time-consuming operation, but also being characterized by the loss of part of the desirable green chlorophyll layer just beneath the avocado skin.

Mechanized techniques for removing avocado skins have been developed in the prior art but only with accompanying limitations. For example, one such technique involved halving of the avocado fruit and removal of the pit, the resulting avocado halves being pressed between two surfaces to extrude the flesh through perforations in one of the surfaces. Although this process overcame the expense of manual operations, it necessarily resulted in the recovered avocado flesh being extruded or mashed. By contrast, it is desirable in certain food products that the avocado flesh be present in a more textured form. At the same time, it is again noted that the desirable green chlorophyll layer of the avocado flesh lies immediately adjacent to the avocado skin and it is not known if complete recovery of this layer was possible by the above process.

In any event, there has been found to remain a need for an improved method of processing avocados to permit effective and efficient removal of the avocado skins, preferably while allowing recovery of all or substantially all of the green chlorophyll layer of the avocado flesh just beneath its skin. At the same time, it is necessary to avoid the introduction of thermally developed off-flavors in the avocado flesh.

SUMMARY OF THE INVENTION

It is therefore an object of this invention to provide a process for removing skins from avocados while avoiding one or more of the problems referred to above.

It is a further object of the invention to provide a process for removing skins from avocados by subjecting them to a high temperature fluid medium for a period of time selected to develop a substantial temperature differential across the avocado skin resulting in a generally continuous vapor boundary between the skin and the avocado flesh for facilitating removal of the skin without thermal degradation of the flesh.

Preferably, the temperature of the fluid medium is maintained at least in the range of about 275°–400° F. and the medium is selected for compatability with the avocado flesh and its subsequent use as a food product.

More particularly, it is an object of the invention to provide a process for removing skins from avocados by immersion of whole avocados or the like in a triglyceride oil heated to a temperature in the range of approximately 275°–400° F. Immersion of the avocados is continued for a short period in the range of about six seconds to one minute in order to develop a substantial thermal differential across the avocado skin for developing a vapor boundary just inside the skin in order to facilitate removal of the skin without developing thermal off-flavors in the avocado flesh.

Within the preceding statement of the invention, it will be apparent that the term "immersion" contemplates placing of the whole avocados in the oil medium. However, the term "immersion" is also intended to include equivalent processes such as where the oil is continuously sprayed or otherwise applied to the surface of the avocados.

It is yet a further object of the invention to provide a process of the type referred to above wherein the triglyceride oil is preferably avocado oil.

It is an even further object of the invention to provide such a process wherein the oil is preferably heated to a temperature of about 370° F. and the avocados are immersed in the oil for a period of about 30 seconds in order to facilitate removal of the skins from the avocados. These conditions are particularly contemplated for thick skinned varieties, such as Hass and Fuerte. The lower end of the broad temperature range of 275°–400° F. is particularly contemplated for thin skinned varieties, such as Zutano. Within the time and temperature ranges described above and especially with the preferred oil temperature and immersion duration, it has been found that a thin layer of vapor or steam is formed just under the skin in order to facilitate removal of the skin from the avocado. It is particularly important to note that essentially none of the very desirable green chlorophyll layer of the avocado flesh just beneath the skin is lost with this process. Rather, the vapor boundary tends to be formed between the green chlorophyll layer and the skin, facilitating removal of the skin by itself while retaining substantially all of the green chlorophyll layer along with the remainder of the avocado flesh for use in various food products.

It is a further related object of the invention to immerse the avocados in oil with their skins intact, the temperature of the oil and the duration of immersion being selected to develop a relatively substantial temperature differential across the avocado skin for causing formation of a generally continuous vapor boundary between the skin and the avocado flesh while leaving the skin generally intact and continuous about the avocado flesh, the process thereafter comprising the steps of cutting through the intact skins and removing the skins before the vapor boundary dissipates and allows the skins to again enter into engagement with the avocado flesh and before heat from the skins can cause the development of off-flavors in the avocado flesh.

Preferably, the skins are separated from the avocado flesh within about two minutes after being removed from the oil.

A particularly surprising result of the present invention is the total lack of any noticeable thermal off-flavors developed in the avocado flesh. It is theorized that this desirable result is achieved because of the relatively high temperature of the immersion medium or oil and the relatively short time during which the skin of the avocado is subjected to the high oil temperature. Thus, a substantial temperature differential is developed across the tough avocado skin. This substantial temperature differential provides a thermal driving force which rapidly produces the vapor boundary just inside the skin to facilitate skin removal. At the same time, the short period of time during which the avocado skin is subjected to this high temperature tends to prevent heating of the avocado flesh and particularly the green chlorophyll layer just inside the skin.

The intact and continuous nature of the skins permits the temperature differential to be developed as described above while preventing the oil from coming into direct contact with the avocado flesh. Also due to the nature of the avocado skin, the temperature differential causes a vapor boundary to be formed just inside the skin and between the skin and the chlorophyll layer of the avocado flesh. The vapor barrier separates the avocado skin from the flesh while both the skin and the vapor barrier serve to insulate the avocado flesh itself from deleterious contact with the high temperature oil. Thus, the process novelly permits the avocado skins to be separated from the flesh without causing harmful effects in the avocado flesh.

A number of additional advantages have also been noted in connection with the present invention and it is, accordingly, yet a further object of the invention to carry out the process of the invention for achieving those advantages which are summarized below.

As with many other food products, avocados tend to have substantial amounts of fungi and bacteria present on their skins. For the purpose of food sanitation, it is important to remove or kill these microorganisms in order to prevent them from accelerating subsequent spoilage of the avocado flesh. Because of the irregular or pebble-like surface quality of certain avocados, it is difficult to remove these organisms by washing, brushing, or the like. However, it has been found that the ultra-high temperature, short-time treatment of the present invention as summarized below also serves to kill or neutralize both fungi and bacteria of the type present on the avocado skins without the need for washing and scrubbing methods or undesirable chemical treatment, for example.

It is also well known that avocados of the type selected for commercial processing to form various food products often have blemishes in the avocado flesh which are not readily apparent from the condition of the skin. After removal of the avocado skins by the process of the present invention, such internal blemishes are at least readily apparent and can be easily removed. Furthermore, upon treatment of avocados by the process of the present invention, many of these underlying blemishes in the avocado flesh tend to cling to the skin so that they are removed from the avocado along with the skin. This characteristic of the process, of course, greatly enhances the quality of avocado flesh recovered by the present invention.

Yet another advantage of the invention was noted in connection with the tendency of avocados to discolor upon being cut or peeled. Undesirable darkening of the exposed surface of the avocado flesh occurs within a very short time (possibly a few hours) when phenolase enzyme is brought into contact with an orthophenolic or flavonoid substrate in the presence of air or oxygen. It has further been noted that the process of the present invention applies high temperature to the surface of the avocado which tends to inactivate these enzymes. Accordingly, the avocado flesh recovered either in the form of avocado halves or puree, tends to be less susceptible to surface darkening.

Yet another advantage of the invention was noted in connection with common knowledge that oils or fats used for cooking or frying are subject to deterioration due to a variety of biological, chemical and physical factors. Oils and fats, for example, may break down or deteriorate due to hydrolysis, oxidation or polymerization. In this connection, hydrolysis is generally caused by reaction with water or steam which breaks down the fat into components including fatty acids and glycerol. Since some of these fatty acids have a sharp odor, an acid flavor and a deleterious effect upon the quality of any food they contact, any buildup during food processing is undesirable. At the same time, oxidation involves the addition of oxygen to the unsaturated glycerides to form peroxides. These peroxides may later decompose and react with moisture to form aldehydes, ketones and certain acids, some of which are responsible for many of the disagreeable odors and flavors noted in various oils.

In this regard, the process of the present invention, including immersion of the avocados in hot avocado oil, has the surprising effect of tending to prevent an increase of free fatty acids within the oil. At the same time, it was most surprising to note that the peroxide value of the oil actually dropped upon its continued use in the process of the invention. The reason for this effect within the avocado oil is not completely understood but may be due to the presence of an unknown anti-oxidant in the avocado skins.

Additional objects and advantages of the invention are made apparent in the following description having reference to the accompanying drawing.

DESCRIPTION OF THE PREFERRED EMBODIMENT

Figure 1:
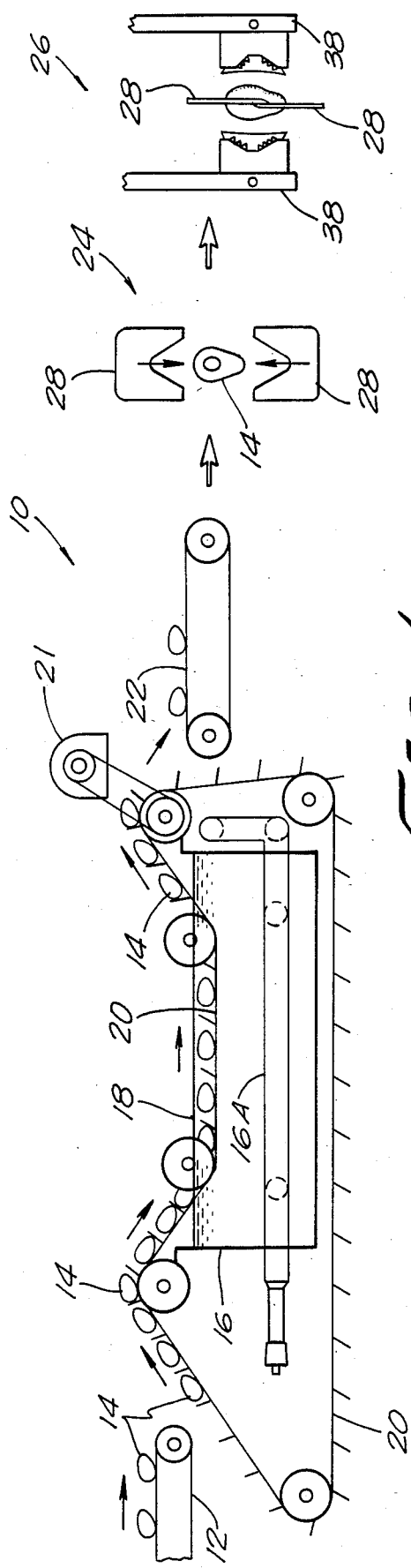
FIG. 1 is a schematic representation of apparatus for carrying out the processing steps of the present invention.

As noted above, the present invention is directed toward a process for removing skins from avocados wherein the avocados are immersed in a triglyceride oil maintained at a temperature within the range of approximately 275°–400° F. Immersion of the avocados is continued for a period within the range of from about six seconds to one minute in order to develop a substantial temperature differential across the relatively tough avocado skin for forming a vapor boundary just inside the skin without substantial heating of the avocado flesh in order to facilitate subsequent removal of the avocado skin. In addition to facilitating removal of the avocado skin without developing undesirable off-flavors within the avocado flesh, a number of additional advantages were noted from the process as summarized above.

The immersion of the avocados is preferably carried out with a triglyceride oil, more preferably avocado oil providing yet additional advantages as were also summarized above. However, the process of the present invention may also be carried out with other triglyceride oils such as oils of cotton seed, corn, soybeans, peanuts, safflower seeds, palm, sesame seeds, olives, coconut and sunflower seeds. The oil is selected to be stable at the relatively high temperatures required both in terms of smoke and flash point. In addition, it is necessary that the oil have reasonable oxidation stability and little tendency to polymerize. The oil should further be free from foaming tendencies and, most importantly, is selected in order to avoid undesirable effects on flavor, color or quality of the final avocado product. Partially hydrogenated or hydrogenated forms of all of the oils listed above may also be used. Hydrogenated oils may, for example, be selected for use at higher processing temperatures because of their higher smoke points and flash points. Since avocados contain an average of about 15% oil, the small additional amount of oil which may be combined with the avocado flesh by carrying out the process of the present invention does not affect high resultant quality of the finished avocado food product.

The preceding list of triglyceride oils is not completely comprehensive, but is representative of oils useful within the present invention. It is noted, for example, that solid glyceryl monostearate was also tested in connection with the process of the invention but was found to exhibit successive foaming and relative instability under conditions of the process. Also, heavy USP mineral oil could be used within the process of the invention; however, its high cost, foaming tendency and lack of acceptance as a food product make it undesirable compared to the other triglyceride oils listed above.

Time, temperature, thermal barrier effects (of the avocado skin) and other conditions of commercial feasibility are taken into consideration in developing parameters for the process. Generally, it was found that best results are obtained by maintaining the oil at a temperature of about 370° F. while immersing the avocado within the oil for a period of about 30 seconds. However, for reasons noted immediately above, the specific conditions of time and temperature may be varied in order to achieve best results in any particular application of the invention.

As noted above, the avocados are necessarily removed from the oil with their skins being generally intact and continuous both to maintain the vapor barrier and to prevent the oil from coming into direct contact with the avocado flesh. Accordingly, after removal from the oil, the skins are first cut or sliced to permit access to the avocado flesh. Thereafter, the cut or sliced skins or skin portions are removed or separated to allow recovery of the avocado flesh.

Generally, it is necessary to cut and separate the skins from the avocado flesh within a relatively short time after removal of the avocados from the oil. If the avocados were allowed to stand for a considerable period of time after removal from the oil, the vapor barrier would disappear either by dissipation through the skin or by cooling. In such an event, the skin would again come into contact with the avocado flesh making it difficult to remove the skins. At the same time, the avocado skin remains relatively hot after removal of the avocados from the oil. If the avocados were allowed to stand for a considerable period of time, heat from the skins could migrate into the avocado flesh and further promote the formation of thermal off-flavors in the avocado flesh.

For reasons such as those noted above, the avocado skins are preferably separated from the avocado flesh within a maximum time period of about two minutes following removal of the avocados from the oil.

It is again noted that numerous advantages were discovered through use of the present invention as discussed in substantial detail above. For example, avocado skins removed by the process of the present invention were virtually free from mold growth for several days whereas control samples of avocado skins removed, for example, by hand peeling exhibited mold growth almost immediately. In this connection, certain molds are easily killed by moist heat (about 100° C.) in several minutes, while other mold spores can only be killed at much higher temperatures. It is believed that the high temperature conditions required by the present invention are thus particularly effective for killing mold and bacteria present on the avocado skins.

In carrying out the process of the present invention, a batch operation is satisfactory using a few avocados at a time. However, for commercial purposes, the avocados are preferably carried on a stainless steel belt or the like for immersion in a hot oil bath, the temperature of the oil bath and the time of immersion being selected in accordance with the preceding parameters. In order to maintain the temperature of the oil, direct heating with a gas flame under a kettle or pot is satisfactory. However, for large scale operations, an external heat exchanger with line filters and the like to clarify the oil are particularly useful.

Referring now to the drawing and particularly to FIG. 1, apparatus for carrying out the method of the invention is generally indicated at 10. The apparatus includes a conveyor 12 for providing an initial supply of avocados 14. The avocados 14 are generally in the condition in which they are removed from trees, that is, with their flesh being relatively ripe and their skins being generally intact and continuous about the flesh.

Avocados from the conveyor 12 are delivered to an immersion tank 16 which is filled with oil as generally indicated at 18. The oil is heated by a heat exchanger system 16A within the immersion tank. The tank 16 includes a conveyor 20, with a variable speed drive 21, for receiving the avocados from the conveyor 12. The conveyor 20 rotates in a clockwise fashion as illustrated, for example, in FIG. 1 in order to carry the avocados through the tank while being immersed beneath the surface of the oil 18. Thereafter, the avocados are removed from the oil by the conveyor 20 and delivered to an intermediate conveyor 22 for further processing. The duration of time during which the avocados 14 remain in the oil can be adjusted by selecting the length of the tank 16 and the speed of the conveyor 20. As noted above and as described in greater detail below, the avocados are immersed within the oil by the conveyor 20 for an appropriate amount of time to create a vapor barrier between the avocado skins and the adjacent chlorophyll layer of the avocado flesh. At the same time, the avocados are removed from the oil before undesirable thermal off-flavors are allowed to develop in the flesh and also before any ruptures appear in the intact and continuous skins of the avocados.

After the avocados 14 are removed from the oil 18, they are carried by the intermediate conveyor 22 to a cutting or slicing station 24 followed by a skin removal station 26.

Figure 3:
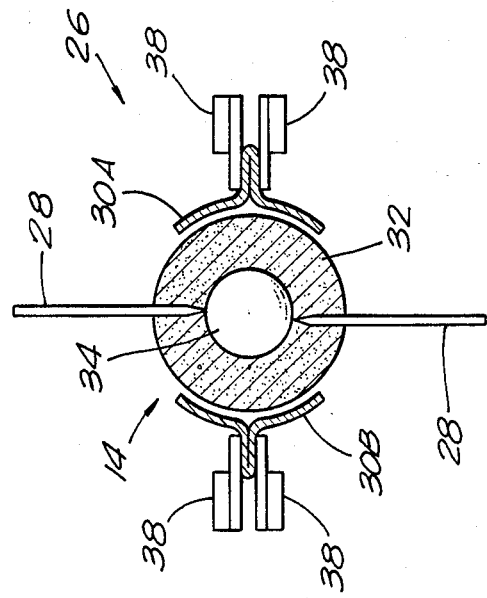
FIG. 3 is an enlarged plan view, with parts in section, of the peel removing apparatus illustrated in FIG. 1.

The cutting or slicing station 24 and the skin removal station 26 are illustrated only in schematic form in FIG. 1 and also in FIGS. 2 and 3 as described in greater detail below. At the same time, it is noted that similar cutting or slicing means and skin removal means as provided respectively by the stations 24 and 26 have been set forth in detail within co-pending U.S. application Ser. No. 682,832 and entitled Method and Apparatus for Removing Skins and Pits from Avocados and the Like filed Dec. 18, 1984 by Ronald C. Bushman, under assignment to Brown International Corporation. Accordingly, that co-pending reference is incorporated herein as though set forth in its entirety to provide a complete description of apparatus suitable for cutting or slicing avocados and removing their skins in accordance with the present invention.

Figure 2:
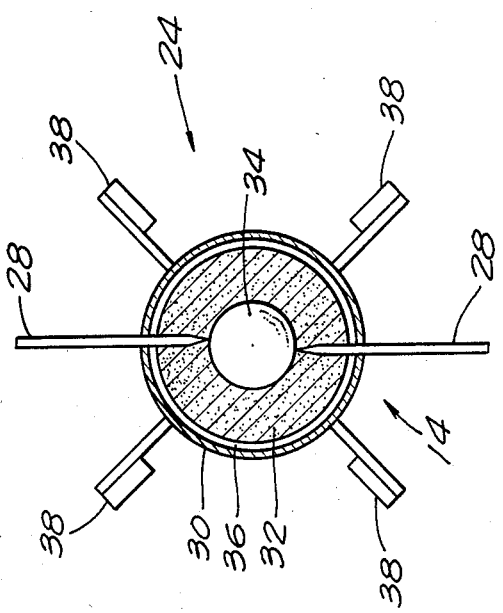
FIG. 2 is an enlarged plan view, with parts in section, of the cutting apparatus illustrated in FIG. 1.

Referring to FIGS. 1 and 2, the cutting station 24 comprises opposed knives or blades 28 which are movable toward each other for cutting in a diametric pattern through the skin. Thereafter, the avocado skin is removed by rotatable elements as best illustrated in FIG. 3.

Before describing the process carried out in the stations 24 and 26, one of the avocados 14 is illustrated in FIG. 2 with its skin 30 being generally intact and continuous while surrounding the flesh 32 and pit 34 of the avocado. At the same time, the skin 30 is slightly spaced apart from the flesh 32 by a vapor barrier 36 as described in greater detail above.

The rotatable elements for engaging and separating the skins 30 from the avocados 14 are referred to collectively at 38.

Initially, the knives 28 are moved toward each other for cutting through the skin 30 of the avocado as described above. Preferably, the knives 28 engage the pit 34 both to hold the avocado flesh while the skin 30 is being removed and also to facilitate separation of the avocado flesh from the pit as described in greater detail within the above noted co-pending reference.

After the knives 28 have cut through the skin 30, the rotatable elements 38 are brought into engagement with the avocado skin 30 on opposite sides of the knives 28 as illustrated in FIG. 2. Thereafter, as described in greater detail within the above noted co-pending reference, the elements 38 are rotated toward each other in pairs in order to pinch and engage the halves 30A and 30B of the avocado skin. Thereafter, the rotatable elements 38 are retracted away from the knives 28 in order to separate the skin halves 30A and 30B from the avocado flesh.

It is believed that the method of the present invention is clearly set forth by the preceding description. It is further believed that various modifications and additions to the process of the present invention are apparent from the preceding description. However, in order to provide a more complete understanding of the invention the following examples of the process of the invention are set forth but are not intended in any way to limit the scope of the invention which is defined only by the claims appended hereto.

EXAMPLE I

Four whole ripe Fuerte avocados in a wire basket were immersed in an electrically heated kettle containing sufficient hot de-waxed raw avocado oil to cover the avocados. The oil was maintained at a temperature of 380° F.

After 30 seconds of immersion, the basket was lifted from the hot oil and the avocados allowed to drain for one-half minute. Using a knife, an insertion was made at the stem end and the avocado skin readily peeled away from the flesh leaving a smooth, green-colored avocado interior. The moisture of the removed skin was found to be about 56% whereas the skin of an unheated control avocado was about 75% indicating a loss of about 20% in moisture content of the skin upon subjection to the process of the invention.

Two of the thermally treated avocados were cut up and mashed to a paste. The other two were handled similarly except that they were blended with about 8% by weight of lemon juice. After standing several days under refrigeration, both samples were observed for color and taste. The control sample began to show darkening on the exposed surface, whereas the avocado paste containing the lemon juice was still a good color. Upon tasting, both were satisfactory but the sample containing lemon juice had a better texture and flavor, thus being generally more acceptable for use as a guacamole dip or the like.

Because of the varietal differences as well as size variation, the time of heat processing was expanded to determine its effect upon the process. Using ripe Fuerte avocados heated in hot avocado oil at 360° F. for varying times, the results were as indicated in Table 1.

TABLE 1

| Initial Wt. of Avocado | Processing Time (360° F.) | Wt. After Processing | Wt. Loss | Wt. of Peel Removed | Meat Recovered | Stripped Peel as % of Meat & Skin |
|---|---|---|---|---|---|---|
| 220 g | 15 secs. | 219 g | 1 g | 9 g | 182 g | 4.74% |
| 240 g | 30 secs. | 237 g | 3 g | 8 g | 191 g | 4.02% |
| 213 g | 45 secs. | 209 g | 4 g | 6 g | 153 g | 3.77% |

The recovery of avocado flesh approaches 100% by use of the process of the present invention. By way of comparison, conventional avocado peeling machines may remove as much as about 24% of the avocado flesh along with the peels. This, of course, compares to about 4% of the weight of the avocado being removed as skin by the process of the present invention. Thus, conventional avocado peeling techniques as employed in the past obviously resulted in the loss of substantial amounts of avocado flesh which is both uneconomical and inefficient. In addition to preserving the high quality of the avocado flavor and appearance, the process of the present invention also permits maximum recovery of the avocado flesh.

EXAMPLE II

Ripe avocados were treated by immersion in oil in generally the same manner described above in Example I. In particular, the Hass avocados were also immersed in avocado oil maintained at a temperature of about 380° F.

The Hass avocados were removed from the oil after different periods of immersion as indicated in Table 2. After being removed from the oil, the avocado skins were removed and both the skins and avocado flesh were inspected and tasted to determine the effects of different times of immersion within the oil.

In carrying out the procedure of Example II, the skins were removed from the Hass avocados within a very short time, possibly 10 to 15 seconds, after being removed from the oil.

From Table 2, it can be seen that the processing of mature Hass avocados in hot avocado oil at 380° F. to loosen the skins is critical and requires an immersion period of from about 12 seconds to about 60 seconds.

When the heat treatment period or duration of immersion is too short, there may be spots on the avocados where the skin adheres to the flesh so that clean separation between the skin and avocado flesh is not accomplished. For avocados removed from the oil after being immersed from about 12 seconds to about 30 seconds, the outer fibrous skin is completely separated from the inner fleshy portion of the avocado with excellent retention of the desirable chlorophyll layer and color without the development of thermal off-flavor.

Although heat treatment or immersion in oil for a period of about one minute results in clean separation between the skin and flesh, the characteristic off-flavor of heated avocado flesh has become noticeable although to a very minimum level.

The development of thermal off-flavors may be noticeable after about 60 seconds and becomes progressively greater with increased time. At about five minutes the avocados become completely unacceptable for use in any food products.

During the procedure described herein in Example II, it was also noted that the skin of the avocados heated or immersed in oil for about three minutes or longer tended to rupture or "blow out" and allow the hot oil to come into direct contact with the avocado flesh. This contact was found to vary rapidly accelerate overheating of the avocado flesh, causing a rapid increase in off-flavor development as well as darkening of the flesh.

The heating or immersion of whole avocados with their skins intact for a period of about 30 seconds in hot avocado oil at a temperature of about 380° F. appears to be an optimum level, particularly for the Hass avocados used in the procedures of Example II and the Fuerte avocados used in the procedures of Example I. The generation of a steam layer or vapor boundary under the skin caused a relatively complete separation or "ballooning" of the skin away from the flesh portion of the avocado. With increased immersion times of about three minutes or more, the skin ruptured as noted above resulting in a loss of the desirable insulating characteristics provided by the intact skin and vapor barrier.

After the skin was loosened from the flesh in the avocados of Example II, the skin was cut and manually separated from the flesh in a relatively short time. However, the mechanical apparatus provided in the above noted co-pending reference is believed to be particularly well suited for carrying out these steps. In any event, it is believed necessary to remove the skin within two minutes at most after removal of the avocados from the hot oil in order to recover the flesh in an optimum condition.

TABLE 2

EFFECT OF HOT OIL PROCESSING AT 380° F. ON MATURE HASS AVOCADOS

| Time of Immersion in Hot Avocado Oil | Effect on Loosening Skin | Effect on Off-Flavor Development | General Comments, Color, Etc. |
| --- | --- | --- | --- |
| 6 Seconds | Some skin spots still adhere to interior flesh | Flavor OK | Natural yellow with attractive green chlorophyll layer. |
| 12 Seconds | Skin generally loosened satisfactorily | Flavor OK | Natural yellow with attractive green chlorophyll layer. |
| 18 Seconds | Skin readily removed | Flavor OK | Natural yellow with attractive green chlorophyll layer. |
| 24 Seconds | Skin readily removed | Flavor OK | Natural yellow with attractive green chlorophyll layer. |
| 30 Seconds | Skin readily removed | Flavor OK | Natural yellow with attractive green chlorophyll layer. |
| 36 Seconds | Skin readily removed | Flavor OK | Natural yellow with attractive green chlorophyll layer. |
| 60 Seconds | Skin readily removed | Barely detectable bitterness develops | Natural yellow with attractive green chlorophyll layer. |
| 3 Minutes | Skin split open in hot oil, becomes stiff and difficult to remove. | Developed bitterness - Unacceptable. | Green chlorophyll layer turns brown. |
| 5 Minutes | Skin becomes dehydrated, cracks in pieces, stiff and brown. | Developed bad off-flavor - totally unacceptable. | Green chlorophyll layer turns brown to black. |

I claim:

1. In a method of processing whole avocados, initially having their skins generally intact and continuous, for removing their skins, the steps comprising:
   immersing the whole avocados with their skins thereon in a triglyceride oil at a temperature in the range of about 275°–400° F.,
   maintaining the avocados in the oil for a period of time selected to develop a relatively substantial temperature differential across the avocado skins and cause formation of a generally continuous vapor boundary between the skins and the avocado flesh, with the skin being generally intact, to facilitate removal of the skins without causing deleterious heating of the avocado flesh and thereby minimizing development of thermal off-flavors, and
   removing the avocados from the oil within the skins loosened from the avocado flesh by said vapor boundary whereupon the skins may be readily removed from the avocado flesh.

2. The method of claim 1 wherein the avocados are maintained in the oil for a period of time in the range of about six seconds to one minute.

3. The method of claim 2 wherein the triglyceride oil is selected from the class consisting of cotton seed oil, corn oil, soybean oil, peanut oil, safflower seed oil, palm oil, sesame seed oil, olive oil, coconut oil, and sunflower seed oil.

4. The method of claim 1 wherein the triglyceride oil is at least partially hydrogenated.

5. The method of claim 4 wherein the triglyceride oil is avocado oil.

6. The method of claim 5 wherein the avocado oil is maintained at a temperature of about 370° F. and the avocados are respectively immersed within the avocado oil for about 30 seconds.

7. The method of claim 2 wherein the triglyceride oil is maintained at a temperature of about 370° F. and the respective avocados are immersed in the triglycerides oil for a period of about 30 seconds.

8. The method of claim 1 further comprising the steps of cutting the intact avocado skins and separating the skins before the vapor boundary dissipates allowing the skins to again enter into engagement with the avocado flesh and before heat from the skin can cause the development of off-flavors in the avocado flesh.

9. The method of claim 8 wherein the skins are separated from the avocado flesh within about two minutes after being removed from the oil.

10. In a method of processing whole avocados, initially having their skins generally intact and continuous, for removing their skins, the steps comprising:
    subjecting the whole avocados with their skins thereon to a high temperature fluid medium,
    maintaining the avocados in the high temperature fluid medium for a period of time selected to develop a relatively substantial temperature differential across the avocado skin and cause formation of a generally continuous vapor boundary between the skin and the avocado flesh while leaving the skin generally intact and continuous, to facilitate removal of the skin without causing deleterious heating of the avocado flesh and thereby minimizing development of thermal off-flavors, and
    removing the avocados from the high temperature fluid medium with the intact skins loosened from the avocado flesh by said vapor boundary,
    cutting through the intact skins to permit release of the avocado flesh, and
    separating the cut skins from the avocados.

11. The method of claim 10 wherein the temperature of the fluid medium is at least in the range of about 275°–400° F.

12. The method of claim 10 wherein the fluid medium is selected for compatibility with the avocado flesh and its subsequent use as a food product.

13. The method of claim 10 wherein the avocado skins are separated from the flesh within about two minutes after being removed from the oil.

* * * * *